United States Patent [19]
Sadot

[11] Patent Number: 5,864,492
[45] Date of Patent: Jan. 26, 1999

[54] RANDOMIZED DIGITAL WAVESHAPE SAMPLES FROM A LOOK UP TABLE

[75] Inventor: Philippe Roger Sadot, Ville D'Avray, France

[73] Assignee: LSI Logic Corporation, Milpitas, Calif.

[21] Appl. No.: 774,300

[22] Filed: Dec. 24, 1996

[30] Foreign Application Priority Data

Dec. 26, 1995 [EP] European Pat. Off. .............. 95402946

[51] Int. Cl.[6] ...................................................... G06F 1/02
[52] U.S. Cl. ............................. 364/718.01; 364/718.02; 364/717.04; 364/718.03
[58] Field of Search ......................... 364/718.01, 718.02, 364/717.04, 718.03

[56] References Cited

U.S. PATENT DOCUMENTS

| | | | |
|---|---|---|---|
| 4,410,954 | 10/1983 | Wheatly, III ............................. | 364/701 |
| 4,815,018 | 3/1989 | Reinhardt et al. ....................... | 364/701 |
| 4,975,699 | 12/1990 | Frey ........................................ | 341/118 |
| 5,014,231 | 5/1991 | Reinhart et al. ......................... | 364/718 |
| 5,202,642 | 4/1993 | Dixon ........................................ | 328/14 |
| 5,459,680 | 10/1995 | Zimmerman et al. ................... | 364/721 |
| 5,467,294 | 11/1995 | Hu et al. ................................... | 364/721 |
| 5,495,505 | 2/1996 | Kundmann ............................... | 375/308 |
| 5,513,219 | 4/1996 | Ham ........................................ | 375/272 |
| 5,563,535 | 10/1996 | Corry et al. .............................. | 327/105 |

OTHER PUBLICATIONS

IEEE Transactions on Communications, vol. 39, No. 7, Jul. 1, 1991, pp. 1046–1048, XP000264864, O'Leary et al., "A Direct–Digital Synthesizer with Improved Spectral Performance".

IEEE Journal of Solid–State Circuits, vol. 28, No. 5, May 1, 1993, pp. 553–559, XP000368743, Riley et al., "Delta–Sigma Modulation in Fractional–N Frequency Synthesis".

Microwaves & RF, vol. 32, No. 1, Jan. 1993, Penton, Cleveland, OH, USA, pp. 59–66, XP000568956, B. Miller, "Technique Enhances the Performance of PLL Synthesizers".

Proceedings of the 37th Midwest Symposium on Circuits and Systems, Aug. 3–5, 1994, IEEE New York, USA, pp. 269–270, XP000532022, W. Chren, "Area and Latency Improvements for Direct Digital Synthesis Using the Residue Number System".

*Primary Examiner*—Ayaz R. Sheikh
*Assistant Examiner*—Tim T. Vo

[57] ABSTRACT

A digital synthesizer for producing a digital frequency signal includes a phase accumulator for repeatedly accumulating a phase value to generate samples of a digital sawtooth signal and a look-up table of digital samples for converting the digital sawtooth signal to a digital waveshape signal. In order to reduce the effect of the quantization of the digital samples, the synthesizer also includes a randomizer for applying a randomizing factor to output digital samples for forming the digital frequency signal. The randomizer includes a randomizing factor generator connected to receive P bits of each digital sample for generating at least one randomizing bit and an summer for summing the remaining N bits of the digital sample and the at least one randomizing bit to generate a digital waveshape sample of the digital frequency signal.

23 Claims, 7 Drawing Sheets

RANDOMIZED DIGITAL WAVESHAPE SAMPLES FROM A LOOK UP TABLE

CROSS REFERENCE TO RELATED APPLICATIONS

This patent application is related to and claims foreign priority under 35 U.S.C. § 119 of European Patent Office Application Nos. 95402947.6 and 95402946.8, both filed Dec. 26, 1995; and commonly owned, co-pending U.S. Patent application Ser. No. 08/773096, entitled "Noise Reduction in Digital Frequency Synthesizers"by Philippe Roger Sadot, filed Dec. 24, 1996 and incorporated by reference herein.

BACKGROUND OF THE INVENTION

1. Field of the Invention

The invention relates to digital frequency synthesizers, and in particular to the reduction of noise in such synthesizers.

2. Description of the Prior Art

Figure 1:
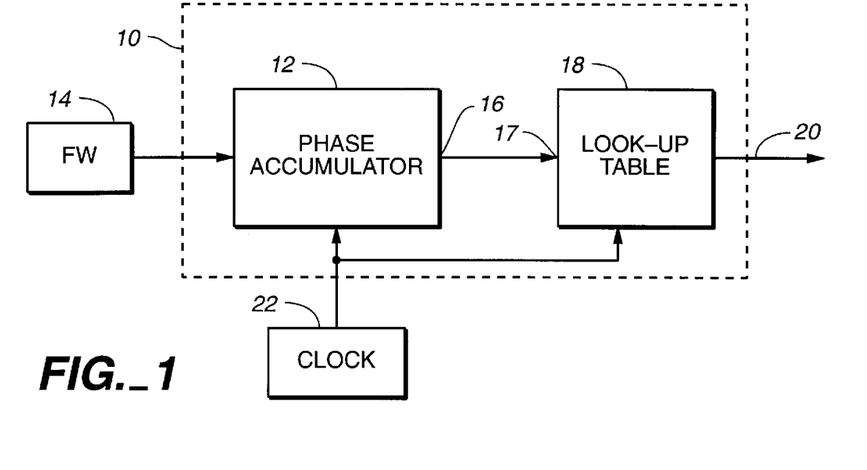
FIG. 1 is a schematic block diagram of a typical digital frequency synthesizer.

Direct Digital Frequency Synthesis (DDFS or DDS) is a technique for generating digital frequency signals. FIG. 1 is a schematic block diagram of a frequency synthesizer for implementing the technique.

In FIG. 1 a phase accumulator 12 repeatedly accumulates a phase value 14 (a phase increment is often called a constant frequency word (FW) or delta-phase word) to generate samples 16 of a digital sawtooth signal, and a look-up table 18 of digital samples for converting the digital sawtooth signal to a digital waveshape for the digital frequency signal 20. The digital samples stored in the look-up table 18 are typically either sine or cosine values for generating a sine wave as the digital frequency signal. A clock 22, which can be external or internal, provides a clock signal CK at a frequency C which allows the digital frequency synthesizer to generate any frequency between 0 and approximately 0.4C.

The generated frequency f is related to the constant frequency word (FW) and the accumulator length L by: $f = C * FW/2^L$.

The frequency resolution is $C/2^L$. For example, with a reference clock at 100 MHZ and a 32-bit accumulator, the resolution is 0.023Hz.

Figure 2A:
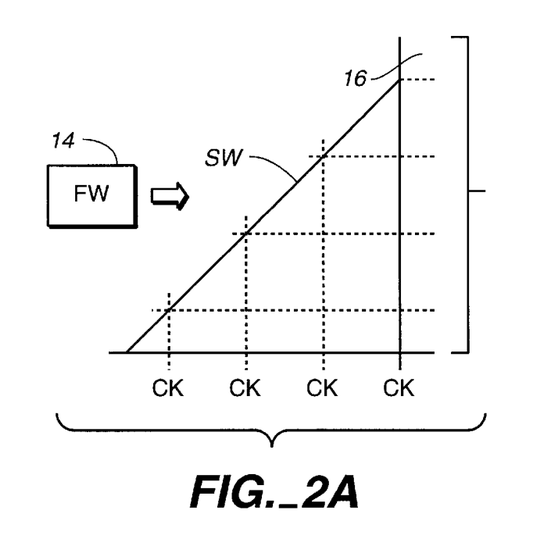
FIGS. 2A, 2B, 2C and 2D schematically represent the generation of the digital frequency signal.

FIGS. 2A–2D illustrate the steps in this process as performed by the apparatus of FIG. 1. As illustrated in FIG. 2A, by adding a constant frequency word 14 on every clock signal CK of the clock 22 to an accumulator 12, and arranging for this to operate in a cyclic fashion, it is possible to generate a sawtooth waveform SW. The sawtooth waveform is sampled by reading out the accumulated values at 16once per clock signal CK. For a given clock frequency and accumulator resolution, the larger the value of the constant frequency word, the higher the frequency of the sawtooth waveform.

Figure 2B:
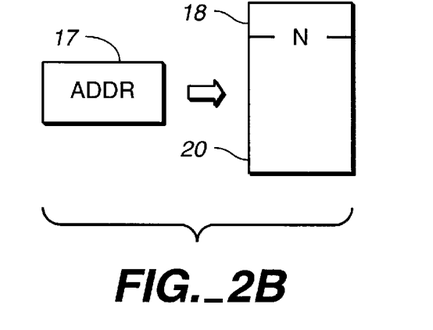

As illustrated in FIG. 2B, the sawtooth waveform samples are used to address the digital waveform samples in the look-up table 18. Typically, the address resolution of the look-up table 18 is less than the resolution of the accumulator 12. Accordingly, the sawtooth waveform samples are truncated in order to generate the look-up table addresses 17.

Figure 2C:
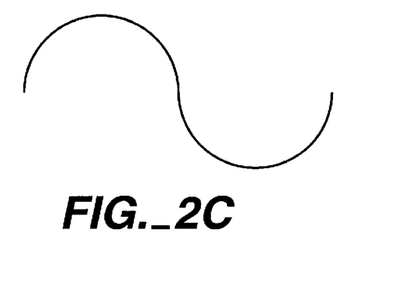
Figure 2D:
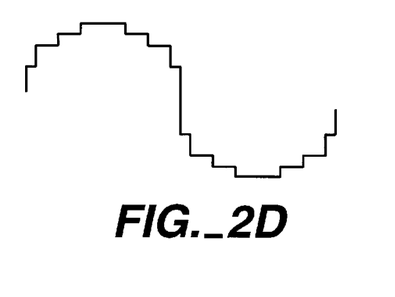

The digital frequency signal 20 is output as a series of digital waveform samples, with a digital waveshape sample being generated for each clock signal CK. FIG. 2C is a schematic representation of a smooth waveform (typically, in practice, a sine wave) and FIG. 2D is a schematic representation of the resulting digital waveshape of the digital frequency signal, which is quantized and therefore does not exactly correspond to the smooth waveform.

Synthesizers of this type are particularly effective as a technique for generating frequency signals where rapid frequency switching is required because the frequency switching time is much less than comparable analog frequency synthesizers that may be used as modulators.

Accordingly, this technique is widely used in the design of digital modulators, for example quadrature amplitude modulators and phase switched keying modulators (M-QAM, M-PSK), and for frequency hopping modems and the like.

However, conventional digital frequency synthesizers suffer from noise problems due to the presence of spurious spectral lines in the frequency signals they generate.

It has been determined that the spectral lines arise from a number of sources as follows:

1) Although the interval between the phase accumulator overflows is not strictly constant, the overflow is a periodic signal, with a period equal to the lowest common multiplier of the constant frequency word and $2^N$.

2) The sawtooth signal is truncated before addressing the look-up table, which creates quantization noise, which is also periodic, with a period equal to the sawtooth signal, that is equal to the lowest common multiplier of the constant frequency word and $2^N$.

3) The look-up table contains quantized digital samples of the waveshape (typically sine or cosine) values which adds to the quantization error.

4) If a Digital to Analog Converter (DAC) is used to convert the sine samples to an analog signal, its non-linearity also introduces a periodic noise source.

Figure 3:
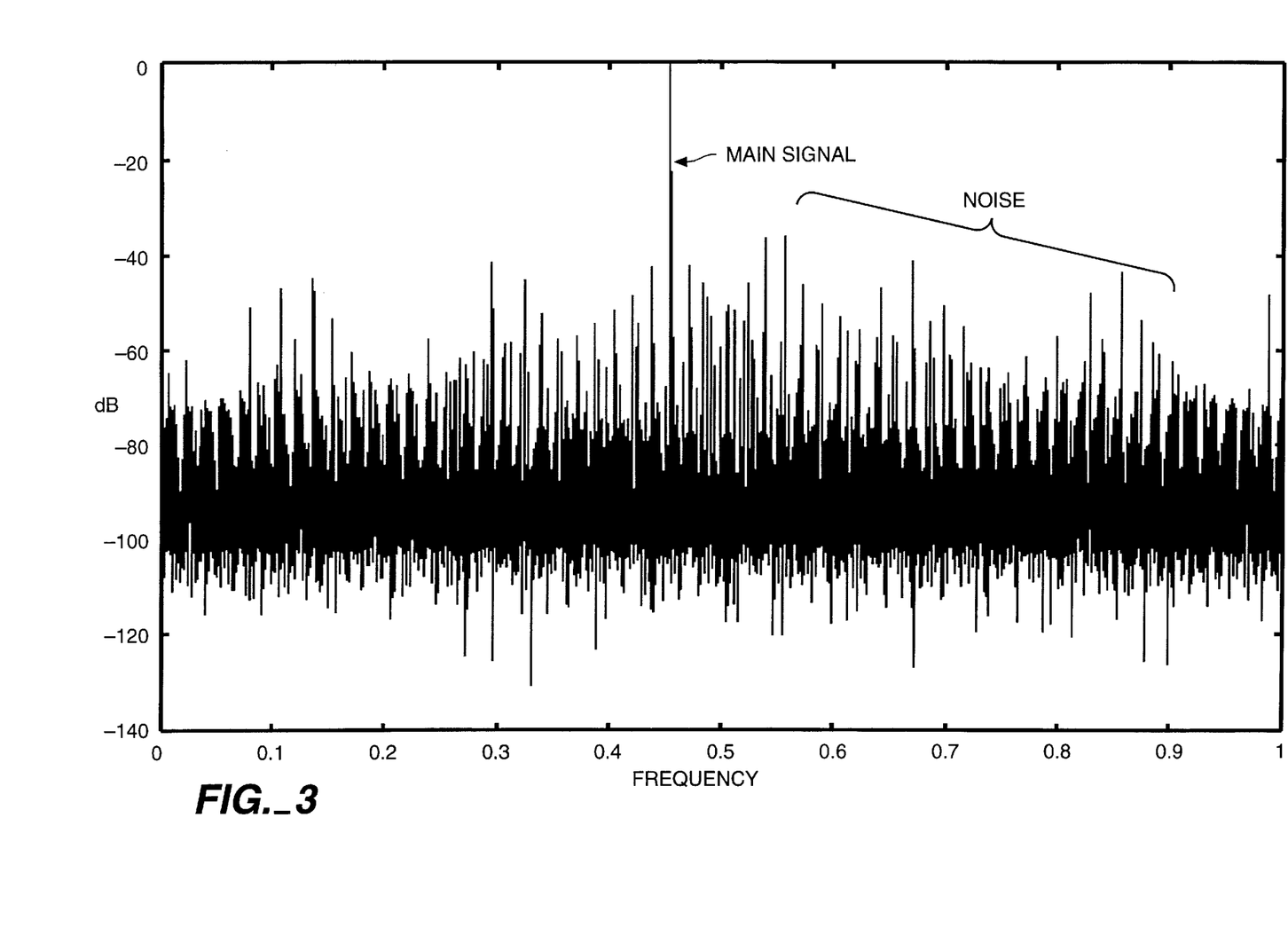
FIG. 3 is a plot, in the frequency domain, of a typical digital frequency signal generated by a conventional digital frequency synthesizer.

All of these signals generate discrete spurious spectral lines which can be as high as −40 dBc from the main signal as represented in FIG. 3. Conventionally, to reduce the effects of the spurious spectral lines, a very large look-up table is used. In particular many address bits are used to minimize the effects of phase truncation (the second noise source in the above list) and a large look-up table word size is used to minimize the sample quantization noise (the third word noise source in the above list).

SUMMARY OF THE INVENTION

An object of the present invention is to reduce the effect of the third noise source permitting the use of a smaller word size for the look-up table.

In accordance with one aspect of the invention, there is provided a digital synthesizer for producing a digital frequency signal comprising: a phase accumulator for repeatedly accumulating a phase value to generate samples of a digital sawtooth signal; a look-up table of digital samples for converting the digital sawtooth signal to a digital waveshape signal, each digital sample comprising a plurality of bits; and a randomizer for applying a randomizing factor to output digital samples for forming the digital frequency signal.

This invention enables the effect of noise which results from the quantized digital signal samples in the look-up table to be reduced by breaking the periodicity of this noise source. The invention recognises that this quantization noise generates spurious lines because it is periodic. If it were non-periodic it would generate a uniform noise density (that is equally distributed between the zero frequency and half the sampling frequency). Accordingly, the invention enables the energy of the spurious lines to be spread throughout the whole frequency range. The noise floor increases very slightly, but the spurious lines disappear, improving the overall frequency signal quality.

Preferably, each digital sample comprises N+P bits, the randomizer comprises a randomizing factor generator connected to receive P bits of each digital sample for generating at least one randomizing bit, and a summer for summing the remaining N bits of the digital sample and the randomizing bit(s) to generate a digital waveshape sample of said digital frequency signal. In this way the randomizing effect is applied to a predetermined number of sample bits and the randomized bit(s) are used to modify the N remaining bits.

In the preferred embodiment of the present invention, the randomizing factor generator comprises a pseudo-random number generator for generating P-bit pseudo-random numbers and a comparator for comparing the P bits of the samples to a P-bit pseudo-random number for generating the randomizing bit(s) in dependence upon the comparison.

Preferably, the pseudo-random number generator comprises a plurality of "m-sequence generators" in parallel. In this manner a very long random number sequence can be generated using standard random number generator units.

In the preferred embodiment, the comparator produces a logical one bit when the numerical value of the P-bits of the digital sample is greater than that of the pseudo-random number. However, alternative implementations could be used to achieve the same effect.

In the preferred embodiment, the summer comprises an adder receiving the remaining N bits of the digital sample and a carry-in input, the output of the comparator being connected to the carry-in input of the adder. However, other implementations (for example, employing a subtraction algorithm) could be used and is contemplated herein.

Preferably, each digital frequency signal sample comprises N waveshape sample bits from the summer and a sign bit to provide N+1 bit digital frequency signal samples.

In the preferred embodiment the sign bit is generated directly by the phase accumulator.

In certain circumstances, overflow of the summer can occur. Preferably, therefore, means are provided for preventing overflow of the summer. These means can take the form of pre-scaling said digital sample values in the look-up table.

The digital samples in the table can be digital sine or digital cosine samples.

Preferably, in order to maximise the storage efficiency of the memory, the digital samples in the table comprise N+P bits, the P bits being the least significant bits and the N bits being the most significant bits.

The invention also provides a digital modulator comprising a digital synthesizer as defined above.

The invention further provides an integrated circuit comprising a digital frequency synthesizer as defined above.

BRIEF DESCRIPTION OF THE DRAWINGS

Embodiments of the invention will be described hereinafter, by way of example only, with reference to the accompanying drawings in which.

DESCRIPTION OF THE PREFERRED EMBODIMENTS

Referring now to FIG. 1, a schematic block diagram of a typical digital frequency synthesizer is illustrated. A digital frequency synthesizer in accordance with the invention comprises the same basic configuration, but with means for applying a randomizing factor to output digital samples to form the digital frequency signal.

A particular embodiment of the invention will be described where it is intended to generate a digital frequency signal with a sample resolution of N+1 bits, comprising N waveshape bits plus a sign bit for each sample. In this embodiment the sign bit is supplied directly from the phase accumulator 12 and therefore is not stored in the look-up table 18. However, for reasons of simplifying the drawings, this is not shown in the Figures.

In this embodiment of the invention, the look-up table 18 (typically a ROM) is arranged to store M=N+P bit digital sine samples. It will be appreciated that cosine values rather than sine values can also be stored in the look-up table 18. Accordingly, where reference is made to sine values in the following, it will be understood that a reference to cosine values could be substituted instead. The digital samples stored in the look-up table are computed in the following manner:

1) The N most significant bits are obtained as if the sine values were sampled directly, but with the lowest matching integer being selected rather than the nearest. In other words, when rounding the sampling values they are rounded down rather than being rounded to the nearest integer. The sine maximum value will correspond to the maximum value storable in the look-up table with N bits set to one. The N-bit maximum value will be used only once.

2) The P least significant bits are then computed. The difference between the N-bit sample value and the exact sine value (multiplied by $2^N$) ranges from 0 to 1. This difference is then sampled into the P least significant bits. The N+P decomposition is like a decimal sampling of the sine, where the N code forms the integer part and P the decimal (fractional) part, the sine having been scaled exactly to fit in the $0,2^N$ scale.

Figure 4:
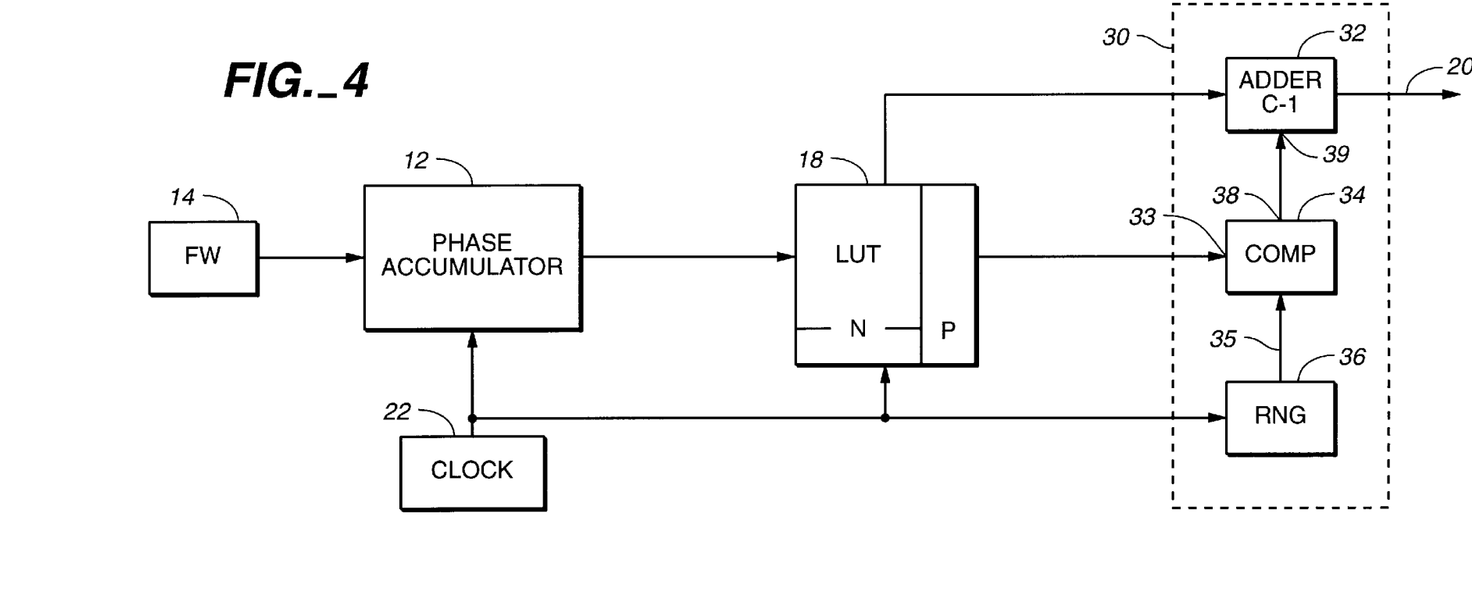
FIG. 4 is schematic block diagram of an example of a digital frequency synthesizer of FIG. 1 in accordance with the invention.

The processing of the N+P bit samples is explained with reference to FIG. 4, which is a schematic representation of an example of a digital frequency synthesizer in accordance with the invention. Specifically, FIG. 4 schematically represents a randomizer 30 connected to the output of the look-up table 18. The randomizer 30 comprises a summer (here an adder) 32, a comparator 34 and a pseudo-random number generator 36. The adder 32 is connected to receive the N most significant bits of digital samples output from the look-up table 18. A first input 33 of the comparator 34 is connected to receive a P-bit number formed by the P least significant bits of a data sample output from the look-up table 18. A second input 35 is connected to receive the P-bit pseudo-random number output of the pseudo-random number generator 36. The pseudo-random number generator 36 is clocked by the clock 22 to supply a P-bit pseudo-random number for each digital sample output from the look-up table 18. The comparator 34 is arranged to compare each P-bit number output from the look-up table to the correspondingly produced P-bit pseudo-random number. The comparator 34 is arranged to output a logical 1 at an output 38 when the P-bit number is greater than the P-bit pseudo-random number. The output 38 of the comparator 34 is connected to a carry-in input 39 of the adder 32, so that when a logical 1 is output from the comparator 34, one is added to the N-bit number formed by the N most significant bits of the digital sample. The comparator 34 is arranged to output a logical 0 at the output 38 when the P-bit number is less than or equal to the P-bit pseudo-random number so that nothing is added to the N-bit number formed by the N most significant bits of the digital sample.

On average therefore, the N-bit output of the randomizer will be the N,P value, as in the case of a one bit DAC. For the purposes of illustration only, if a digital sample of an input where the N=3 bits are 100 and the P=2 bits are 01, the randomizer would generate an (N=3)-bit output of 100 with a 75% probability and an (N=3)-bit output of 101 with a 25% probability, for an average of 100,01. The additional P bits can thus be thought of as the "decimal" part, or the probability to adding +1 to the N most significant bit number.

The result of using the randomizer is to add a randomizing factor to the generation of the least significant digit. Thus this technique reduces the effect of the quantization of the digital samples in the look-up table.

With the embodiment described above with reference to FIG. 4, it is possible that the comparison between the P-least significant bits of the single sample value having the N-bit maximum value $2^N-1$ (all N bits=1) to the pseudo-random number could lead to a logical 1 being generated. In this case, the generation of the logical 1 from the comparator 34 would cause the adder to overflow, in that 1 would be added to $2^N-1$ in the N-bit adder 32. This would then generate an all zero N-bit number which would be incorrect. This problem can be overcome in a number of ways.

Figure 5:
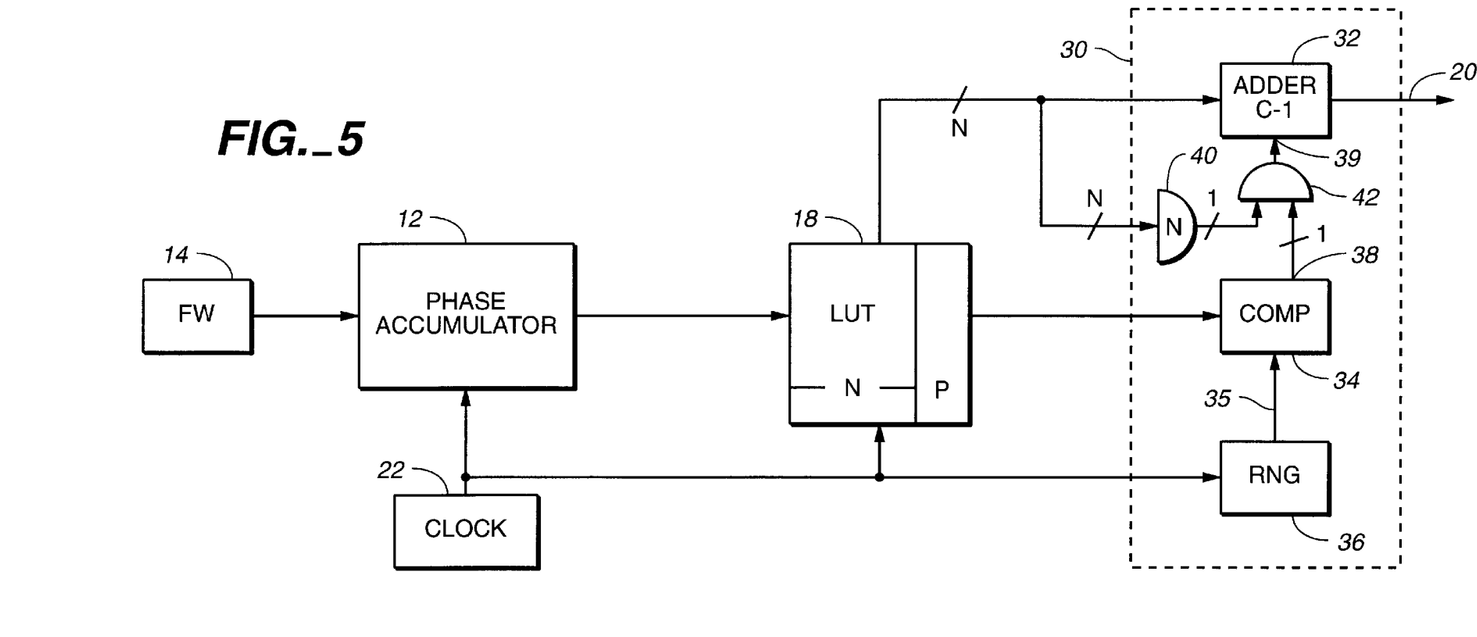
FIG. 5 is a schematic block diagram of another example of a digital frequency synthesizer in accordance with the invention.

A first possible technique is to prevent adder overflow where the N most significant bits output from the look-up table are all ones by inhibiting a logical 1 output by the comparator from reaching the adder. FIG. 5 illustrates a possible implementation of this technique. In particular, an N-input NAND gate 40 is connected to the N most significant bits from the look-up table 18, so that a logical zero is output from the NAND gate 40 when all N bits from the look-up table are set to 1, and a logical zero is output otherwise. The output of the NAND gate 40 is connected to one input of an AND gate 42, the other input of which is connected to the output 38 of the comparator 34. Consequently, the output of the AND gate 42, which is connected to the input 39 of the adder 32, is zero when all N bits are 1 and corresponds to the output of the comparator 34 otherwise.

Another possible technique is to detect the carry-out bit from the adder and to invert the N-bits output from the N-bit count output from the adder when a carry out signal is detected.

Both of the above possibilities are simple to implement and work successfully, as long as the pseudo-random number sequence is sufficiently long that inhibiting the adder overflow does not have a periodicity which would generate an unwanted spectral line.

An alternative technique which will not generate any spectral lines, is to pre-multiply the sample values in the look-up table before they are supplied to the randomizer so that overflow cannot occur. In accordance with this technique, the look-up tables are pre-multiplied by:

$$(2^{N+P}-2^P)/(2^{N+P}-1).$$

The resulting maximum sample value, taking all N+P bits into account, is $2^{N+P}-1$, whereas the maximum stored sample value is $2^{N+P}-2^P$ (all N most significant bits=1). Thus the following can be implemented:

Sample to use=sample stored * $(2^{N+P}-2^P)/(2^{N+P}-1)$ (1)

Figure 6:
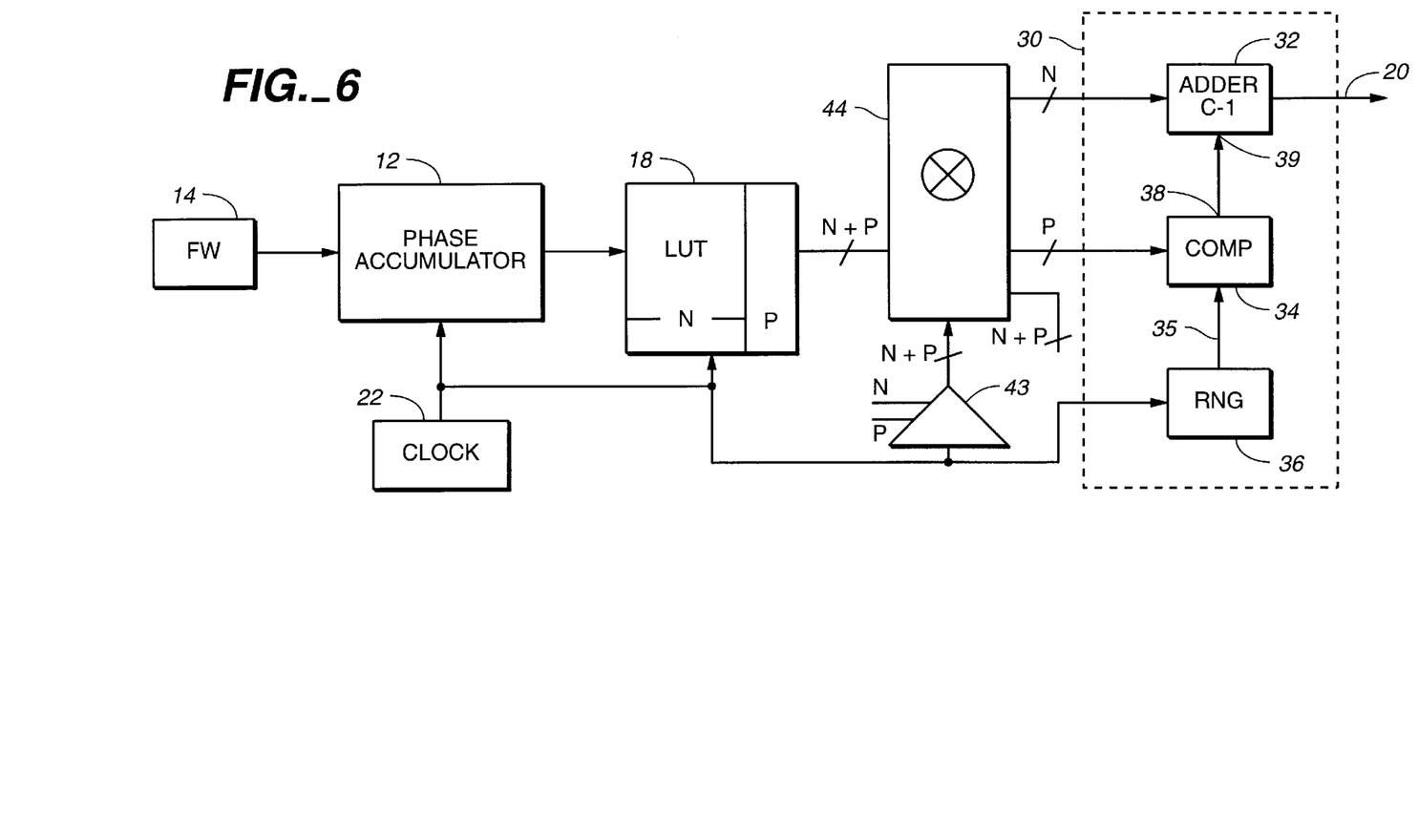
FIG. 6 is a schematic block diagram of a further example of a digital frequency synthesizer with means for scaling digital signal samples.

FIG. 6 is a schematic block diagram illustrating the scaling technique. In FIG. 6, the values of P and N are input into a multiplexer or small read only memory 43 containing scale factors to generate a multiplication factor as a function of P and N (as defined in equation (1) above) on N+P bits. This N+P bit multiplication factor is then used to multiply the N+P bit output from the look-up table 18 in a multiplier 44. The output of the multiplier 44 is 2* (N+P) bits, the N+P most significant bits of which include the N-bit number to be input to the adder 32 and the P next-most significant bits which are input to the comparator 34. The N+P least significant bits are discarded.

The arrangement described with reference to FIG. 6 enables the outputs of variable size (different values of N and P) to be generated from a common look-up table. It is therefore useful in developing configurations having different values of N and P. However, if the output size is fixed, which will typically be the case, then the values stored in the look-up table 18 can be pre-scaled. In other words the additional scaling circuitry of FIG. 6 is not required. In this case, the circuitry used has exactly the same configuration as the circuitry described with reference to FIG. 4. The only difference is that the values stored in the ROM are pre-scaled by a factor corresponding to equation (1) above.

FIGS. 4, 5 and 6 all illustrate the use of a pseudo-random number generator. Any one of a number of conventional pseudo-random number generator types could be used. In the preferred embodiment, a set of parallel "m-sequence" generators (i.e., linear generators using shift registers whose outputs are fed back according to primitive polynomials) is used. An analysis of such generators is to be found, for example, in "Finite Fields for Computer Scientists and Engineers", by Robert J MacEliece, Kluwer Academic Publishers.

To avoid other periodic effects it is recommended to use long pseudo-random number sequences. If a plurality R of independent sequences are used in parallel, it is recommended that their periods are coprime, so that the total period of the random word generator is equal to the product of the R periods.

In a preferred implementation, a generator of degree 61 has been used, which ensures an extremely long period of $2^{61}-1=2.3*10^{18}$.

The use of the invention provides a dramatic improvement in performance, particularly for digital frequency synthesizers with a small output size (number of bits). Such a digital frequency synthesizer can be designed as a large digital frequency synthesizer with the randomizer technique acting as an enhanced quantizer. The Signal to Spurs Ratio (SSR) can thus be dramatically improved when compared to a digital frequency synthesizer scaled for the true output size. An SSR of 90dB can be generated for an 8 bit signed output, working internally with a 16 bit sample size. The performance increases with P. Due to truncation effects, P should be greater than or equal to 2 if the scaled samples are stored in the look-up table 18 and P should be greater than or equal to 3 where the scaling is performed externally as described with reference to FIG. 6.

Figure 7:
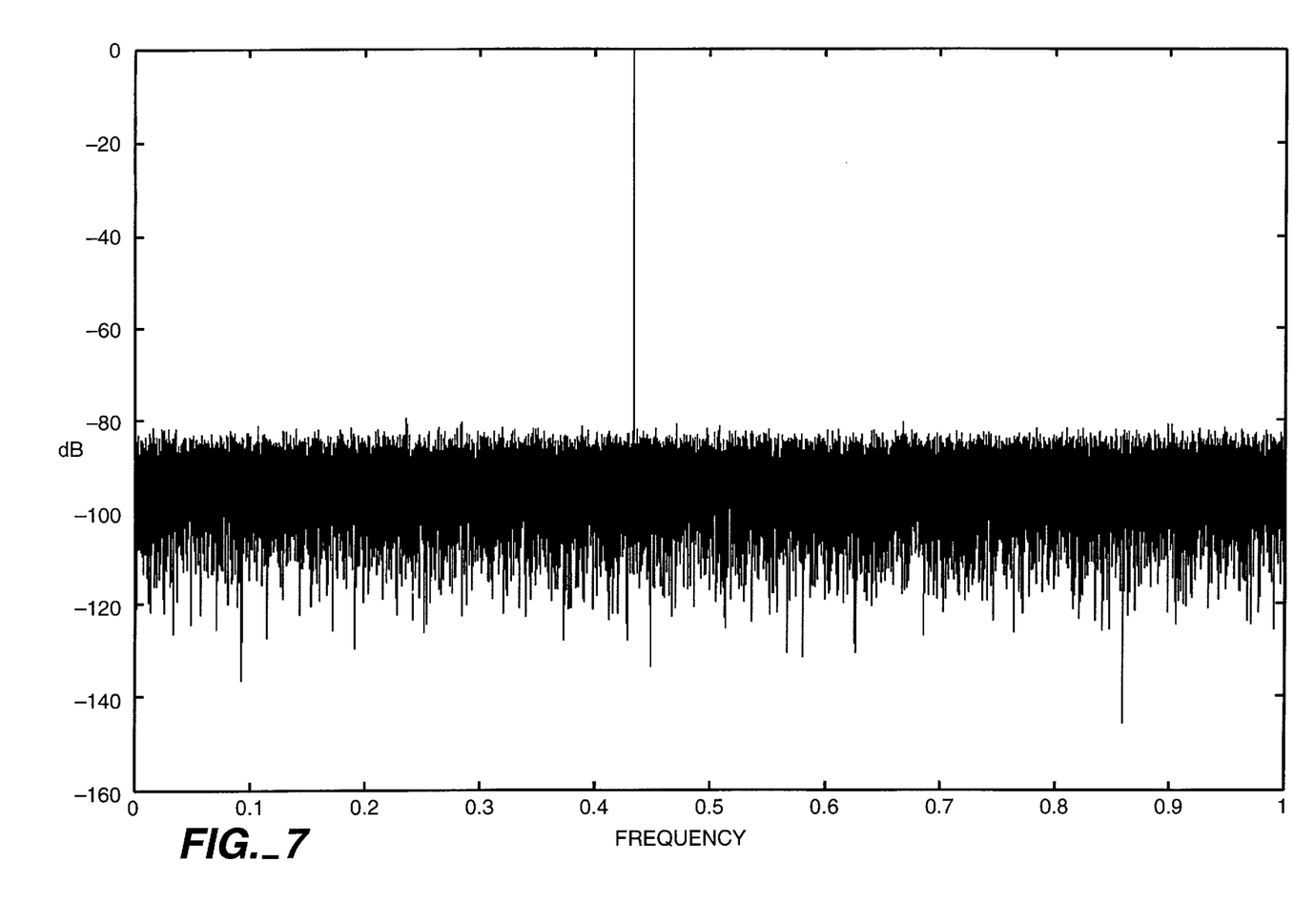
FIG. 7 is a plot, in the frequency domain, of the output of a digital frequency synthesizer in accordance with the invention.

For an 8-bit output digital frequency synthesizer (N=8), a 20 dB improvement in the Signal to Spurs Ratio has been achieved with 8 additional bits in the look-up table (P=8), and a 0 dB improvement with 3 additional bits (P=3). The improvement is approximately linear between these values and increases more slowly for P>8. FIG. 7 is a plot, in the frequency domain, of an example of the output of a digital frequency synthesizer in accordance with the invention with an output size of 7 bits and with 8 additional bits per sample (i.e. N=7, P=8). A spectral purity of −83 dB is thus achieved with a 7 bit output size.

Thus, the invention enables a high degree of spectral purity to be obtained with a relatively low number of bits. For example, −90 dB spectral purity can be obtained with only 8 bits (N=8), compared to 16 using a conventional digital frequency synthesizer. The invention also achieves this with a very low noise floor. The spreading of the energy from the spectral lines achieved through the use of the present invention has a very minor effect on the overall noise floor.

High quality analog frequency signals can be generated using a digital frequency synthesizer in accordance with the invention and a digital to analog converter with only 8 bit resolution. An 8-bit DAC is much less complicated and expensive than a 16-bit DAC.

Figure 8:
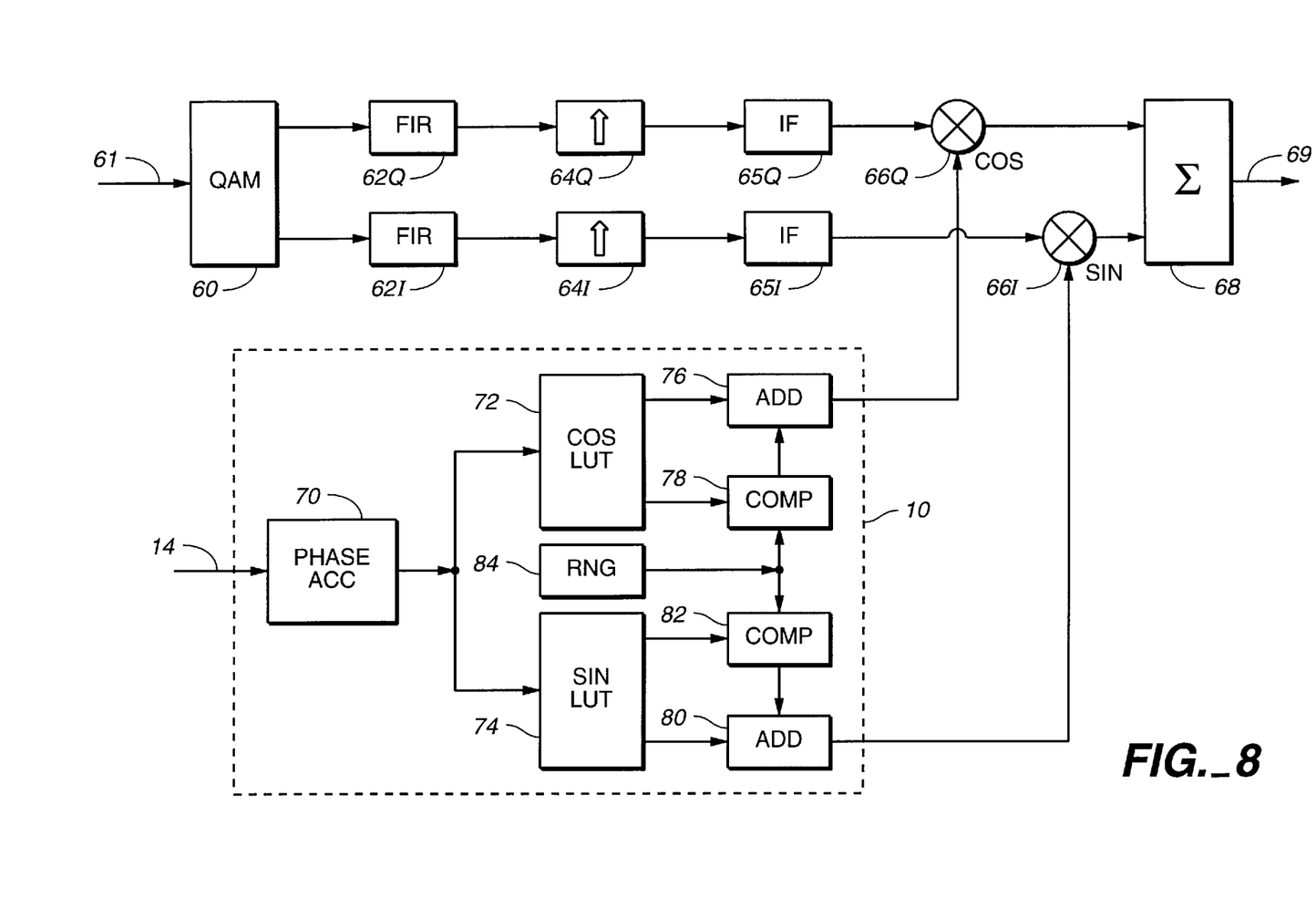
FIG. 8 is a schematic block diagram of a quadrature amplitude modulator (QAM) employing a digital frequency synthesizer in accordance with the invention.

FIG. 8 is a schematic block diagram of a quadrature amplitude modulator incorporating a digital frequency synthesizer in accordance with the invention. An input bit stream 61 is received by a quadrature amplitude modulation mapper 60 which maps the bit stream values to form streams of Q and I values. The Q and I values are passed via respective FIR filters 62Q, 62I and respective up-samplers 64Q and 64I. The stream of Q and I values from the up-samplers 64Q and 64I are then passed via respective interpolators 65Q and 65I before being multiplied by a stream of cosine and sine values, respectively, in respective multipliers 66Q and 66I before being added in an adder 68 to be output as a modulated signal 69. The cosine and sine values are generated by a digital frequency synthesizer constructed in accordance with the teaching of the present invention.

The digital frequency synthesizer 10 in this embodiment of the invention generates a first digital frequency signal using cosine values and a second digital frequency signal using sine values. In this example, a single phase accumulator 70 generates successive sawtooth signals as described for the phase accumulator 12 of FIG. 1. The sawtooth samples output of the phase accumulator 70 are passed in parallel to a cosine look-up table 72 and a sine look-up table 74. In each of the cosine and sine look-up tables 72 and 74, respectively, appropriate digital samples comprising N+P bits, as described with reference to FIGS. 4 to 6 above, are stored. The N and P bit outputs of the cosine table are passed to an adder 76 and comparator 78, respectively.

Similarly, the N and P bit outputs of the sine table are passed to an adder 80 and comparator 82, respectively. Each adder/comparator combination in FIG. 8 corresponds to the adder/comparator combinations of FIGS. 4 to 6. In the present embodiment, however, a single pseudo-random number generator 84 is used to generate the random number sequence for both of the comparators 78 and 82. It will be appreciated that the cost of implementing the digital frequency synthesizer for dual cosine and sine signals can be reduced by sharing the phase accumulator and pseudo-random number generators between the cosine and sine channels. Also, a common internal, or external clock (not shown) can be used.

A digital synthesizer as described above can be implemented using any appropriate circuit technology. Typically, it will be implemented in an integrated circuit (e.g., an ASIC) using conventional integrated circuit technology. It could be implemented as a separate component, but will typically be implemented with other functions (e.g. as or including a modulator as described with reference to FIG. 8) in an integrated circuit.

Although particular embodiments of the invention have been described by way of example, it will be appreciated that additions, modifications and alternatives thereto may be envisaged within the scope of the invention.

For example, the N most significant bits of the waveshape samples stored in the read only memory are derived by rounding down the appropriate sine or cosine values, and then the randomizing factor is added to those N most significant digits. However, it will be appreciated that the N most significant bits of the waveshape stored in the read only memory could be derived by rounding up the appropriate sine or cosine values, and then the randomizing factor would be subtracted from those N most significant digits. In this case, the maximum sine value would be represented by N binary 0 bits, so that means would need to be provided for detecting a value of N binary 0 bits output from the look-up table and to process this accordingly.

The performance of the digital frequency synthesizer in accordance with the present invention could be further improved by employing means for reducing the effect of the second noise source described above.

Suitable means for this form the subject matter of commonly owned, co-pending U.S. Patent application Ser. No. 08/773,096 entitled "Noise Reduction in Digital Frequency Synthesizers" by Philippe Roger Sadot, filed Dec. 24, 1996 (Attorney Docket No. P2751US), incorporated by reference herein, which is a U.S. counterpart of European Patent Office Application No. 95402946.6, filed Dec. 26, 1995. The co-pending application describes the use of a first order sigma-delta modulator between the output of the phase accumulator and the input of the look-up table to reduce the effect of the noise which results from truncating the output of the phase accumulator before this is used to address the look-up table.

The present invention, therefore, is well adapted to carry out the objects and attain the ends and advantages mentioned, as well as others inherent therein. While a presently preferred embodiment of the invention and various aspects thereto has been given for purposes of disclosure, numerous changes in the details of construction, interconnection and arrangement has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A digital synthesizer for producing a digital frequency signal, comprising:
   a phase accumulator for repeatedly accumulating a phase value from a phase word to generate samples of a digital sawtooth signal;
   a look-up table comprising a plurality of digital waveshape sample values, each of said plurality of digital waveshape sample values comprising N+P bits and associated with a one of the samples of the digital sawtooth signal;
   a pseudo-random number generator for generating P-bit pseudo-random numbers;
   a comparator connected to said look-up table and receiving the P bits of said plurality of digital waveshape sample values;
   said comparator connected to said pseudo-random number generator and receiving tie P-bit pseudo-random numbers, wherein said comparator compares the P-bits of each of said plurality of digital waveshape sample values to a one of the P-bit pseudo-random numbers and generates at least one randomizing bit in dependence upon said comparison,
      said at least one randomizing bit being at a first logic level when the numerical value of said P-bits of each of said plurality of digital waveshape sample values is greater than the one of said P-bit pseudo-random numbers,
      said at least one randomizing bit being at a second logic level when the numerical value of said P-bits of each of said plurality of digital waveshape sample values is equal to or less than the one of said P-bit pseudo-random numbers; and
   a summer for summing the N bits of each of said plurality of digital waveshape sample values and said at least one randomizing bit to generate a plurality of randomized digital waveshape samples for producing a digital frequency signal therefrom.

2. The digital synthesizer according to claim 1, wherein said pseudo-random number generator comprises a plurality of "m-sequence generators" in parallel.

3. The digital synthesizer according to claim 1, wherein said summer comprises an adder receiving said N bits of each of said plurality of digital waveshape sample values and a carry-in input, said comparator having an output connected to a carry-in input of said adder.

4. The digital synthesizer according to claim 1, wherein each of said plurality of randomized digital waveshape samples comprises N bits from said summer and a sign bit.

5. The digital synthesizer according to claim 1, comprising logic for preventing overflow of said summer.

6. The digital synthesizer according to claim 1, wherein said plurality of digital waveshape sample values in said look-up table are digital sine values.

7. The digital synthesizer according to claim 1, wherein said plurality of digital waveshape sample values in said look-up table are digital cosine values.

8. The digital synthesizer according to claim 1, wherein said plurality of digital waveshape sample values in said look-up table comprise N+P bits, said P bits being the least significant bits and said N bits being the most significant bits.

9. The digital synthesizer according to claim 1, further comprising a modulator having a carrier frequency input connected to the digital frequency signal, an information input connected to an information signal and an output having an output signal consisting of the digital frequency signal modulated by the information signal.

10. The digital synthesizer according to claim 1, wherein the digital synthesizer is fabricated on an integrated circuit.

11. The digital synthesizer according to claim 1, wherein the digital synthesizer is fabricated in an integrated circuit package.

12. The digital synthesizer according to claim 4, wherein said sign bit is generated directly by said phase accumulator.

13. The digital synthesizer according to claim 5, wherein said logic prevents overflow of said summer by pre-scaling said plurality of digital waveshape sample values in said look-up table.

14. A method of producing a digital frequency signal, comprising the steps of:
   repeatedly accumulating a phase value from a phase word to generate samples of a digital sawtooth signal;
   associating each of the digital sawtooth signal samples with a one of a plurality of digital waveshape sample values stored in a look-up table, each of the plurality of digital waveshape sample values comprising N+P bits;
   generating pseudo-random numbers of P-bits;
   comparing the P bits of each of the plurality of digital waveshape sample values with a corresponding P-bit pseudo-random number and generating at least one randomizing bit in dependence upon this comparison, wherein
   the at least one randomizing bit being at a first logic level when the numerical value of the P-bits of each of the plurality of digital waveshape sample values is greater than the one of the P-bit pseudo-random numbers,
   the at least one randomizing bit being at a second logic level when the numerical value of the P-bits of each of the plurality of digital waveshape sample values is equal to or less than the one of the P-bit pseudo-random numbers; and
   summing the N bits of each of the plurality of digital waveshape sample values and the at least one randomizing bit to generate a plurality of randomized digital waveshape samples for producing a digital frequency signal therefrom.

15. The method according to claim 14, wherein the step of generating the P-bit pseudo-random numbers is done with a plurality of "m-sequence generators" arranged in parallel.

16. The method according to claim 14, wherein the summing step comprises the steps of adding the N bits of each of the plurality of digital waveshape sample values and a carry-in input, the result of the comparison step forming said carry-in input.

17. The method according to claim 14, wherein each of the plurality of randomized digital waveshape samples comprises N bits from the summing step and a sign bit.

18. The method according to claim 14, further comprising the step of preventing overflow in the summing step.

19. The method according to claim 14, wherein the plurality of digital waveshape sample values in the look-up table are digital sine values.

20. The method according to claim 14, wherein the plurality of digital waveshape sample values in the look-up table are digital cosine values.

21. The method according to claim 14, wherein the plurality of digital waveshape sample values in the look-up table comprise N+P bits, the P bits being the least significant bits and the N bits being the most significant bits.

22. The method according to claim 17, comprising the step of generating the sign bit in the phase value accumulation step.

23. The method according to claim 18, wherein the step of preventing overflow comprises the step of pre-scaling the plurality of digital sample values in the look-up table.

* * * * *